United States Patent
Lee

(10) Patent No.: US 8,506,722 B2
(45) Date of Patent: Aug. 13, 2013

(54) METHOD FOR CLEANING FILTERING MEMBRANE

(75) Inventor: Kwang-Jin Lee, Yongin-si (KR)

(73) Assignee: Kolon Industries Inc., Kwacheon-si (KR)

( * ) Notice: Subject to any disclaimer, the term of this patent is extended or adjusted under 35 U.S.C. 154(b) by 0 days.

(21) Appl. No.: 13/265,148

(22) PCT Filed: Apr. 19, 2010

(86) PCT No.: PCT/KR2010/002428
§ 371 (c)(1),
(2), (4) Date: Dec. 12, 2011

(87) PCT Pub. No.: WO2010/123238
PCT Pub. Date: Oct. 28, 2010

(65) Prior Publication Data
US 2012/0090641 A1    Apr. 19, 2012

(30) Foreign Application Priority Data
Apr. 20, 2009    (KR) .................. 10-2009-0034198

(51) Int. Cl.
*B08B 5/00*    (2006.01)
(52) U.S. Cl.
USPC ............. 134/22.1; 134/26; 134/28; 134/30; 134/34; 134/36; 134/41; 134/42; 210/321.69; 210/636; 210/639
(58) Field of Classification Search
USPC ............. 210/321.69, 636, 639; 134/22.1, 134/26, 28, 30, 34, 36, 41, 42
See application file for complete search history.

(56) References Cited

U.S. PATENT DOCUMENTS

| | | | |
|---|---|---|---|
| 5,647,988 A * | 7/1997 | Kawanishi et al. | 210/636 |
| 6,984,331 B2 * | 1/2006 | Halstead et al. | 210/764 |
| 2001/0050095 A1 * | 12/2001 | Yamada et al. | 134/28 |
| 2007/0056904 A1 * | 3/2007 | Hogt et al. | 210/636 |
| 2007/0210002 A1 | 9/2007 | Mullette et al. | |
| 2008/0116128 A1 * | 5/2008 | Hashimoto et al. | 210/321.89 |
| 2009/0127190 A1 * | 5/2009 | Ong et al. | 210/617 |

FOREIGN PATENT DOCUMENTS

| | | |
|---|---|---|
| JP | 7-16566 A | 1/1995 |
| JP | 2004-25045 A | 1/2004 |
| JP | 2006-204996 A | 8/2006 |
| JP | 2008-508093 A | 3/2008 |

* cited by examiner

*Primary Examiner* — Bibi Carrillo
(74) *Attorney, Agent, or Firm* — Birch, Stewart, Kolasch & Birch, LLP

(57) ABSTRACT

A method for cleaning a filtering membrane, contaminated by contaminants including inorganic and organic materials during a fluid-filtering process, is disclosed, the method comprises cleaning the filtering membrane by using a first cleaning solution of pH 6~9 so as to remove the organic material from the filtering membrane; and cleaning the filtering membrane by using a second acid cleaning solution so as to remove the inorganic material from the filtering membrane, wherein the cleaning method of the present invention uses the first cleaning solution having pH 6~9 instead of a strong-alkaline cleaning solution so as to prevent the filtering membrane from being damaged, and also uses the cleaning solution maintained at a relatively low temperature instead of hot water so as to improve economical efficiency by reduction of energy consumption.

12 Claims, 1 Drawing Sheet

METHOD FOR CLEANING FILTERING MEMBRANE

TECHNICAL FIELD

The present invention relates to a method for cleaning a filtering membrane for treatment of a fluid, and more particularly, to a recovery cleaning method for removing contaminants from a filtering membrane through the use of chemical cleaning agent.

BACKGROUND ART

A separation method for treatment of a fluid may include a separation method using heating or phase-changing, and a separating method using a filtering membrane. The separating method using a filtering membrane is advantageous in that it can obtain high reliability of water treatment since the water purity required can be easily and stably satisfied by adjusting the size of the pores of a membrane. Furthermore, since the separation method using a filtering membrane does not require a heating process, a membrane can be used with microorganism which is useful for separation process but may be adversely affected by heat.

According to an operation method, a filtering membrane module can be largely classified into a suction type filtering membrane module and an external pressure type filtering membrane module.

The suction type filtering membrane module is submerged into a water tank filled with fluid to be treated. A negative pressure is applied to the inside of the filtering membranes, whereby only fluid passes through the wall of each membrane and solid elements such as impurities and sludge are rejected. This suction type filtering membrane module is advantageous in that the manufacturing cost is relatively low and that the installation and maintenance cost is reduced since a facility for circulating fluid is not required. However, the suction type filtering membrane module has a disadvantage of the limitation on flux per unit period.

In case of the external pressure type filtering membrane module, an external pressure is applied to fluid to be treated so that only fluid passes through the wall of each membrane and solid elements such as impurities and sludge are rejected. Even if the external pressure type filtering membrane module necessarily requires a facility for circulating fluid, a flux per unit period in the external pressure type filtering membrane module is relatively larger than a flux per unit period in the suction type filtering membrane module.

When the fluid in which contaminants including solid elements are suspended is filtered through the use of filtering membrane module, the filtering membrane might be easily contaminated due to the contaminants, thereby causing low water permeability of the filtering membrane. Thus, it is necessary to regularly clean the filtering membrane by removing the contaminants from therefrom.

According to a cleaning purpose, a method for cleaning the contaminated filtering membrane may be largely classified into a maintenance cleaning and a recovery cleaning.

A main purpose of the maintenance cleaning is to maintain good permeation performance of filtering membrane. The maintenance cleaning is mainly performed via physical cleaning such as backwashing process or aeration process during a water treatment or after a temporary stoppage of water treatment. The backwashing process removes impurities from a surface of membrane by causing air or water to flow backward through the membrane during a temporary stoppage of water treatment. The aeration process removes impurities from a surface of membrane by generating rising air bubbles through air jetted from an aeration pipe positioned under the membrane.

The recovery cleaning is performed when the filtering membrane module exhibits serious deterioration in permeation performance of a membrane due to contaminants accumulated by a long-term use. A main purpose of the recovery cleaning is to recover permeation performance of the membrane. The recovery cleaning is to clean the filtering membrane through the use of chemical cleaning agent after stopping the fluid-filtering process.

One method of the recovery cleanings according to the related art is using hot water together with the chemical cleaning agent. Generally, according as a surface temperature of the filtering membrane is raised more, cleaning efficiency becomes better. Thus, the hot water is used for enhancing the cleaning efficiency of the recovery cleaning. For using the hot water, a heating apparatus has to be additionally provided, whereby economical efficiency is lowered due to the increased power consumption.

Another method of the recovery cleanings according to the related art is using only the chemical cleaning agent without using the hot water. Generally, an organic material largely exists in the contaminants. If using an alkaline cleaning agent, efficiency of removing the organic material can be enhanced. Thus, instead of using the hot water, the strong-alkaline cleaning agent with pH 12 is used for enhancing the efficiency of removing the organic material. However, the strong-alkaline cleaning agent might cause a damage of the filtering membrane. Especially, polyvinylidene fluoride (PVDF) typically used for the filtering membrane is weak in strong-alkaline material. Thus, if carrying out the recovery cleaning using the strong-alkaline cleaning agent, the cleaning efficiency is raised somewhat, but the filtering membrane may be damaged.

DISCLOSURE OF INVENTION

Technical Problem

Therefore, the present invention has been made in view of the above problems, and it is an advantage of the present invention to provide a method for cleaning a filtering membrane, which is capable of enhancing economical efficiency without damaging a filtering membrane by a cleaning agent used for a cleaning process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for cleaning a filtering membrane, contaminated by contaminants including inorganic and organic materials during a fluid-filtering process, comprises cleaning the filtering membrane by using a first cleaning solution of pH 6~9 so as to remove the organic material from the filtering membrane; and cleaning the filtering membrane by using a second acid cleaning solution so as to remove the inorganic material from the filtering membrane.

Advantageous Effects of Invention

A method for cleaning a filtering membrane according to the present invention has the following advantages.

Instead of a strong-alkaline cleaning solution used in the related art, the cleaning method of the present invention uses a first cleaning solution having pH 6~9, so that it is possible to prevent a filtering membrane from being damaged by the first cleaning solution.

In addition, instead of hot water used in the related art, the cleaning method of the present invention uses a cleaning solution maintained at a relatively low temperature corresponding to 15~40° C., whereby economical efficiency can be improved as compared to the related art method using the hot water, in view point of energy consumption.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an external pressure type hollow fiber membrane module according to an embodiment of the present invention and a method for cleaning a hollow fiber membrane used for the same will be described with the accompanying drawings.

A filtering-membrane cleaning method according to the present invention can be applied to a hollow fiber membrane used in a suction type hollow fiber membrane module as well as a hollow fiber membrane used in an external pressure type hollow fiber membrane. Furthermore, a filtering-membrane cleaning method according to the present invention can be applied to a flat-type membrane, and also can be readily applied to various kinds of filtering membranes used in a separation method.

Figure 1:
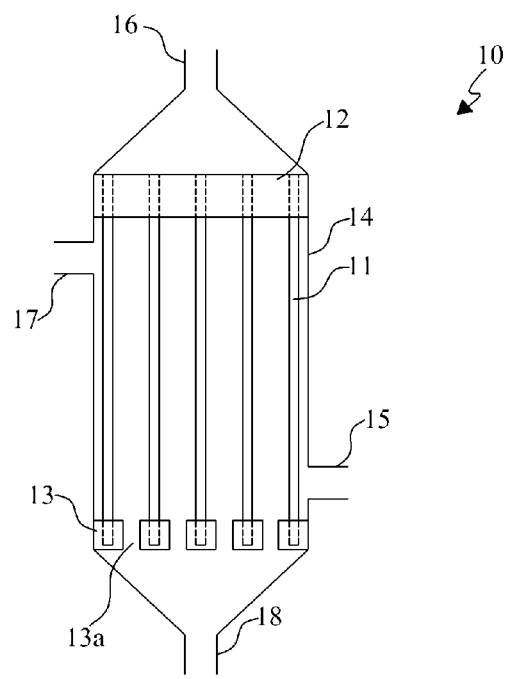
FIG. 1 is a schematic view illustrating an external pressure type hollow fiber membrane module according to an embodiment of the present invention.

FIG. 1 is a schematic view illustrating an external pressure type hollow fiber membrane module according to an embodiment of the present invention.

As shown in FIG. 1, the external pressure type hollow fiber membrane module 10 according to an embodiment of the present invention includes plural hollow fiber membranes 11, a first potting portion 12, a second potting portion 13, a module case 14, a feed-water inlet port 15, a permeated-water outlet port 16, a concentrated-water outlet port 17, and an air inlet port 18.

The plural hollow fiber membranes 11 are grouped into bundles, wherein longitudinal directions of the respective hollow fiber membranes 11 are provided in parallel. At this time, both ends of each hollow fiber membrane 11 are potted into the first and second potting portions 12 and 13. The hollow fiber membrane 11 may be formed of polyvinylidene fluoride (PVDF), but not limited to this.

The first potting portion 12 serves to pot one end of each of the plural hollow fiber membranes 11. At one end of the hollow fiber membrane 11, a hollow is formed to be open. Thus, permeated water permeating through the hollow fiber membrane 11 is discharged to the permeated-water outlet port 16 through the open hollow. At this time, since the first potting portion 12 is potted into an inner surface of the module case 14, the permeated water flowing into the hollow of the hollow fiber membrane 11 is discharged only to the permeated-water outlet port 16 without being mixed with feed water to be treated. The first potting portion 12 may be made of thermosetting resin, for example, epoxy resin, urethane resin, or silicon rubber. Selectively, the thermosetting resin may be mixed with filler such as silica, carbon black, or carbon fluoride to enhance strength of the first potting portion 12 and simultaneously to reduce setting shrinkage of the first potting portion 12.

The second potting portion 13 serves to pot the other end of each of the plural hollow fiber membranes 11. At the other end of the hollow fiber membrane 11, a hollow is formed to be sealed. Like the first potting portion 12, the second potting portion 13 may be made of only thermosetting resin, or thermosetting resin mixed with filler. Also, the second potting portion 13 is provided with plural openings 13a through which air is supplied to the hollow fiber membrane 11, which enables an aeration cleaning for the hollow fiber membrane 11.

The feed water to be treated is introduced into the module case 14 through the feed-water inlet port 15.

The permeated water permeating through the hollow fiber membrane 11 and introduced into the hollow of the hollow fiber membrane 11 is discharged to the external through the permeated-water outlet port 16.

The feed water whose concentration of solid elements such as impurities and sludge becomes higher due to the discharge of permeated water (hereinafter, referred to as "concentrated water") is discharged to the external through the concentrated-water outlet port 17.

Also, air for cleaning the hollow fiber membrane 11 during the filtering process is supplied through the air inlet port 18.

A function of the aforementioned external pressure type hollow fiber membrane module according to the present invention will be explained as follows. First, the feed water to be treated is introduced into the module case 14 through the feed-water inlet port 15. Then, the feed water introduced into the module case 14 is pressurized by a pump, whereby the feed water permeates through the hollow fiber membrane 11 and then flows into the hollow of the hollow fiber membrane 11. Thus, the permeated water permeating through the hollow fiber membrane 11 is discharged to the external through the permeated-water outlet port 16. Also, the concentrated water whose concentration of solid elements such as impurities and sludge becomes higher due to the discharge of permeated water is discharged to the external through the concentrated-water outlet port 17.

According as the filtering process of the external pressure type hollow fiber membrane module is repeated several times, contaminants included in the feed water are accumulated on the hollow fiber membrane 11. In this case, even though the feed water is pressurized by the pump, poor water permeation of the hollow fiber membrane 11 is inevitable. In order to overcome this problem, a physical cleaning process for the hollow fiber membrane 11 should be performed during the filtering process or after stopping the filtering process.

An example of the physical cleaning process is an aeration cleaning process. In more detail, as the air is introduced through the air inlet port 18, the introduced air is supplied to the hollow fiber membrane 11 through the plural openings 13a of the second potting portion 13, whereby the contaminants accumulated on the hollow fiber membrane 11 are removed therefrom. This aeration cleaning process may be performed during the filtering process. Another example of the physical cleaning process is a backwashing process. In order to carry out the backwashing process for the hollow fiber membrane 11, the permeated water stored in a permeated-water tank (not shown) connected with the permeated-water outlet port 16 is introduced into the hollow fiber membrane 11 through the use of predetermined pump, to thereby remove the contaminants from the hollow fiber membrane 11. This backwashing process is performed after stopping the filtering process.

Even if the physical cleaning process for the hollow fiber membrane 11 is carried out regularly, the water permeability of the hollow fiber membrane 11 might be lowered due to the long-term use of the hollow fiber membrane 11. In this case, a recovery cleaning process using a chemical cleaning agent can be applied to the hollow fiber membrane 11.

Figure 2:
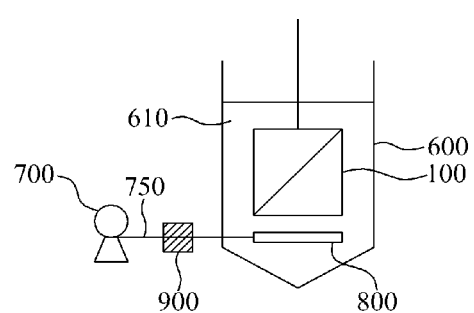
FIG. 2 is a schematic view illustrating a recovery cleaning method of hollow fiber membrane according to an embodiment of the present invention.

FIG. 2 is a schematic view illustrating a recovery cleaning method for hollow fiber membrane according to an embodiment of the present invention.

As shown in FIG. 2, a cleaning tank 600 is filled with a cleaning solution 610. A recovery cleaning process is carried out by submerging a hollow fiber membrane module 100 into the cleaning tank 600 filled with the cleaning solution 610.

During the fluid-filtering process, the hollow fiber membrane may be contaminated by the various kinds of contaminants including inorganic or organic materials. Thus, when carrying out the recovery cleaning process, it is necessary to change the composition of cleaning solution 610.

In order to remove the organic material from the hollow fiber membrane, the hollow fiber membrane is cleaned in a first cleaning solution of pH 6~9. Then, the hollow fiber membrane is cleaned in a second acid cleaning solution so as to remove the inorganic material from the hollow fiber membrane.

After cleaning the hollow fiber membrane by the first cleaning solution, the hollow fiber membrane is cleaned using the second cleaning solution. Instead, the hollow fiber membrane may be cleaned using the first cleaning solution after completing the cleaning with the second cleaning solution. While the organic material is formed to be relatively more flexible and thicker, the inorganic material is formed to be relatively more concentrated and thinner. In this respect, it is preferable that the organic material be firstly removed, and the inorganic material removed secondly, in view point of efficiency.

The second cleaning solution may include HCl, $NHO_3$, $H_2SO_4$, or citric acid. Also, the second cleaning solution may have 0.5~2% by weight of acid concentration. If the acid concentration is less than 0.5% by weight, efficiency of removing the inorganic material may be lowered. Meanwhile, if the acid concentration is more than 2% by weight, cleaning efficiency is not relatively high in contrast to the increased cost, whereby economical efficiency might be lowered.

A heating process for the second acid cleaning solution is not necessary since the second acid cleaning solution has good efficiency of removing the inorganic material even at room temperature or less. Also, the cleaning process using the second acid cleaning solution is carried out for 3~9 hours. If it is carried out less than 3 hours, the cleaning efficiency is lowered. Meanwhile, if it is carried out more than 9 hours, the yield is lowered.

Preferably, the first cleaning solution has pH 6~9. If it is less than pH 6, efficiency of removing the organic material is lowered. Meanwhile, if it is more than pH 9, the hollow fiber membrane of polyvinylidene fluoride (PVDF) is damaged. It is more preferable that the first cleaning solution has pH value not more than 8.5 for preventing PVDF from being damaged.

The first cleaning solution may be neutral cleaning agent, for example, silicon-based cleaning agent, vegetable-based cleaning agent, or two-phase cleaning agent. The neutral cleaning agent may be various cleaning agents known to those skilled in the art. The neutral cleaning agent has 0.1~0.7% by weight of concentration. If it is less than 0.1% by weight, efficiency of removing the organic material may be lowered. Meanwhile, if it is more than 0.7% by weight, cleaning efficiency is not relatively high in contrast to the increased cost, whereby economical efficiency might be lowered.

The first cleaning solution may be the neutral cleaning agent including chlorine constituents. The chlorine constituents may be sodium hypochlorite (NaOCl), but not limited to this.

It is preferable that the temperature of the first cleaning solution be ranged from 15° C. to 40° C. If the temperature of the first cleaning solution is less than 15° C., the efficiency of removing the organic material might be lowered. Meanwhile, if the temperature of the first cleaning solution is more than 40° C., energy consumption is too much increased in contrast to the increase in efficiency of removing the organic material. The cleaning process using the first cleaning solution may be carried out for 3~9 hours. At this time, the cleaning efficiency may be lowered if it is less than 3 hours; and the yield may be lowered if it is more than 9 hours.

Instead of strong-alkaline cleaning solution used in the related art, the cleaning method of the present invention uses the first cleaning solution of pH 6~9 so as to remove the contaminants of the organic material from the hollow fiber membrane, so that it is possible to prevent the hollow fiber membrane from being damaged by the cleaning solution. Furthermore, instead of hot water used in the related art, the cleaning method of the present invention uses the cleaning solution maintained at the relatively-low temperature corresponding to 15~40° C., whereby energy consumption of the present invention is considerably lower than energy consumption of the related art, thereby resulting in the improved economical efficiency.

Selectively, the aeration cleaning process can be carried out simultaneously with the recovery cleaning process of the present invention. That is, as shown in FIG. 2, an aeration diffuser 800 for supplying air to the cleaning tank 600 may be additionally provided.

When the aeration diffuser 800 is positioned under the hollow fiber membrane module 100, the aeration diffuser 800 may be connected with an air supplying means 700 such as air blower or air compressor through a pipe 750, wherein the air supplying means 700 is provided to supply air to the aeration diffuser 800. Accordingly, air discharged from the air supplying means 700 is supplied to the aeration diffuser 800 through the pipe 750, and is then sprayed to the hollow fiber membrane module 100, to accomplish the aeration cleaning process. The aeration cleaning process may be carried out together with the recovery cleaning process using the first cleaning solution and/or the recovery cleaning process using the second cleaning solution.

A heater 900 may be additionally provided in the pipe 750 so that air heated by the heater 900 may be sprayed from the aeration diffuser 800. The heater 900 may be formed in a hot-wire type wounded on the pipe 750, but not limited to this. That is, the heater 900 may be formed in any type enabling to heat the air moving through the pipe 750. If spraying the heated air from the aeration diffuser 800 by the additionally-provided heater 900, the temperature of the first cleaning solution stored in the cleaning tank 600 is raised. Thus, an additional apparatus for heating the first cleaning solution is not required.

As mentioned above, the recovery cleaning process of the present invention may be carried out in the additional cleaning tank 600 as shown in FIG. 2, but not limited to this. After discharging the feed water from the module case 14 of the external pressure type hollow fiber membrane module 10 as shown in FIG. 1, the first cleaning solution and the second cleaning solution are sequentially supplied to the inside of the module case 14, to thereby carry out the recovery cleaning process.

EMBODIMENTS AND COMPARATIVE EXAMPLES

Preparing Samples

Contaminated hollow fiber membranes are collected from hollow fiber membrane modules of filtering plants located in Seoul, Korea, wherein the hollow fiber membrane modules have been operated for 18 months, and then a mini hollow fiber membrane module sample is prepared by the collected hollow fiber membranes.

Embodiment 1

The prepared mini hollow fiber membrane module sample is cleaned using a neutral cleaning solution (Cleanfil®-CO200 ppm) maintained at 18° C. for 3 hours, and then is cleaned using an acid cleaning solution (1% oxalic acid) maintained at 18° C. for 6 hours.

After completing the cleaning process, a filtering process using pure water is applied to the mini hollow fiber membrane module sample, to thereby calculate a recovery rate for the hollow fiber membrane. The result will be shown in the following table 1.

The recovery rate can be defined in the following equation 1.

The recovery rate(%)=[Permeability of membrane after cleaning/Permeability of new membrane]*100     [Equation 1]

At this time, 'new membrane' indicates a new hollow fiber membrane which is not contaminated. The permeability is defined in the following equation 2.

Permeability(LMH/Bar)=flux/TMP(Trans Membrane Pressure)     [Equation 2]

At this time, 'flux' indicates an amount of fluid filtered in a unit area of membrane per unit time period, which corresponds to 'liter/($m^2$*hour)'; and 'TMP' indicates a pressure required for a specific flux, whose unit is 'Bar'.

Embodiment 2

The prepared mini hollow fiber membrane module sample is cleaned using a mixed cleaning solution obtained by mixing a neutral cleaning solution (Cleanfil®-CO200 ppm) with 800 ppm sodium hypochlorite (NaOCl) maintained at 18° C. for 3 hours, and then is cleaned using an acid cleaning solution (1% oxalic acid) maintained at 18° C. for 6 hours.

After completing the cleaning process, a filtering process using pure water is applied to the mini hollow fiber membrane module sample, to thereby calculate a recovery rate for the hollow fiber membrane. The result will be shown in the following table 1.

4) Comparative Example 1

The prepared mini hollow fiber membrane module sample is cleaned using an acid cleaning solution (1% oxalic acid) maintained at 18° C. for 6 hours.

After completing the cleaning process, a filtering process using pure water is applied to the mini hollow fiber membrane module sample, to thereby calculate a recovery rate for the hollow fiber membrane. The result will be shown in the following table 1.

5) Comparative Example 2

The prepared mini hollow fiber membrane module sample is cleaned using a mixed cleaning solution obtained by mixing a neutral cleaning solution (Cleanfil®-CO200 ppm) with an acid cleaning solution (1% oxalic acid) maintained at 18° C. for 9 hours.

After completing the cleaning process, a filtering process using pure water is applied to the mini hollow fiber membrane module sample, to thereby calculate a recovery rate for the hollow fiber membrane. The result will be shown in the following table 1.

TABLE 1

| Classification | Recovery rate (%) |
| --- | --- |
| Embodiment 1 | 90 |
| Embodiment 2 | 98 |
| Comparative example 1 | 34 |
| Comparative example 2 | 35 |

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for cleaning a filtering membrane, the filtering membrane being contaminated with inorganic and organic materials during a fluid-filtering process, the method comprising:
   cleaning the filtering membrane with a first cleaning solution of pH 6~9 so as to remove the organic material from the filtering membrane;
   cleaning the filtering membrane with a second cleaning solution which is acidic so as to remove the inorganic material from the filtering membrane; and
   spraying air to the filtering membrane,
   wherein spraying the air to the filtering membrane is carried out simultaneously with at least one of the cleaning the filtering membrane with the first cleaning solution and cleaning the filtering membrane with the second cleaning solution, and
   wherein the method further comprises heating the air before the air is sprayed to the filtering membrane.

2. The method according to claim 1, wherein the second cleaning solution includes HCl, $NHO_3$, $H_2SO_4$, or citric acid.

3. The method according to claim 1, wherein the second cleaning solution has 0.5~2% by weight of an acid concentration.

4. The method according to claim 1, wherein the cleaning the filtering membrane with the second cleaning solution is carried out for 3~9 hours.

5. The method according to claim 1, wherein the first cleaning solution includes a neutral cleaning agent.

6. The method according to claim 1, wherein the first cleaning solution includes a neutral cleaning agent with chlorine constituents.

7. The method according to claim 1, wherein cleaning the filtering membrane with the first cleaning solution is carried at 15~40° C. for 3~9 hours.

8. The method according to claim 1, wherein cleaning the filtering membrane with the first cleaning solution is carried out before cleaning the filtering membrane with the second cleaning solution.

9. The method according to claim 1, wherein the filtering membrane is a hollow fiber membrane.

10. The method according to claim 1, wherein the filtering membrane is formed of polyvinylidene fluoride (PVDF).

11. The method according to claim 5, wherein the neutral cleaning agent is a silicon-based cleaning agent, vegetable-based cleaning agent, or two-phase cleaning agent.

12. The method according to claim 5, wherein the neutral cleaning agent has a concentration of 0.1~0.7% by weight.

* * * * *